UNITED STATES PATENT OFFICE.

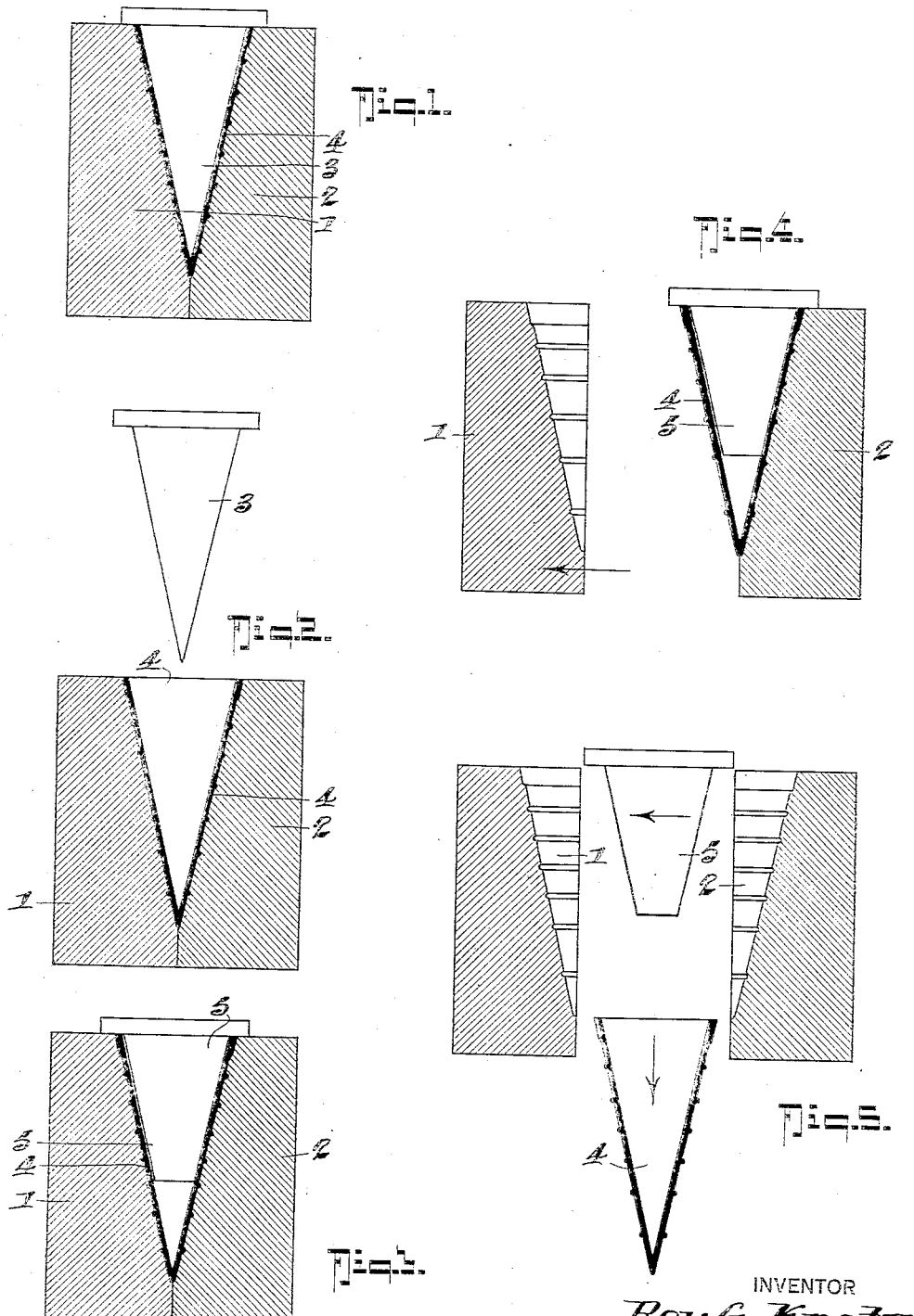

ROY G. KRATZ, OF OMAHA, NEBRASKA, ASSIGNOR TO L. C. SHARP, OF PLATTSMOUTH, NEBRASKA.

METHOD OF RELEASING CUP-PASTRY FROM MOLDS.

1,329,086.     Specification of Letters Patent.    Patented Jan. 27, 1920.

Application filed July 22, 1918. Serial No. 246,269.

*To all whom it may concern:*

Be it known that I, ROY G. KRATZ, a citizen of the United States, and a resident of Omaha, in the county of Douglas and State of Nebraska, have invented certain new and useful Improvements in Methods of Releasing Cup-Pastry from Molds, of which the following is a specification.

My invention relates to the art of cup pastry manufacture in which the article (usually ice cream cones, cups or horns, etc.) is molded and baked between separable female molds, cores being provided for shaping the interior of the article.
In my application filed May 29, 1917, Serial No. 171,753 I have disclosed an apparatus in which my method is carried out automatically, although the method is not limited to use with automatic machines but is applicable to hand molds as well.

In the art as heretofore practised, the core is usually used as a finger to detach the pastry from the mold halves, which halves are usually separated substantially simultaneously from the midplane containing the axis of the core. My present method contemplates the withdrawal of the core before separating the mold sections and then holding the article by internal engagement (preferably with a dummy or extracting core) against one of the mold sections, while opening the other mold section and subsequently detaching the article from the section against which it was held by internal engagement from the mold section against which it has been held to permit the article to drop always in a uniform manner and be discharged from the mold. This is especially of benefit where the article is to be deposited into a receptacle held beneath the molds, which receptacle may be either the trimming mechanism of a machine when the method is used in an automatic machine or the box or chute into which the articles are deposited on leaving the molds.

In the drawings accompanying this specification, I have diagrammatically illustrated one way of using my invention, and by reference to the drawings it will be seen that Figure 1 is a diagrammatic cross section of the molds with the core in place, showing the article to be molded.

Fig. 2 is a similar view, the core being detached from the article which is held within the molds.

Fig. 3 is a similar view showing a dummy or extracting core introduced in lieu of the molding core removed.

Fig. 4 is a similar view showing the manner of holding the core against the stationary mold section while moving the other mold section away to free it from the cone.

Fig. 5 is a similar view showing the final relative position of the parts when the extracting core has been moved laterally to detach the article from the female mold section against which it had formerly been held.

In the drawings, 1 designates the movable mold section and 2 the relatively stationary mold section; 3 designates the mold core; 4 the molded article and 5 the dummy or extracting core.

In using my method it is not necessary to use the dummy or extracting core as the operator may hold the article against the relatively stationary section of the female mold by inserting his finger into the article and effecting the retention of the article against the stationary mold section. However, I prefer, owing to the heat and owing to sanitary reasons, to use a dummy or extracting core to effect this purpose and in carrying out my method, the mold parts are positioned initially as indicated in Fig. 1. After the article has been molded and as the material of the article has become solidified to retain its form, the core 3 is first lifted from the article 4 and then the article is held by internal engagement, preferably through the insertion of a dummy core 5, the internal holding element (dummy core 5) and the stationary section 2 of the mold serving to retain the article against the stationary section of the mold while the movable section 1 is opened, as shown in Fig. 4, thus preventing the article from following the opening mold section. After the article has been freed from the opening mold section it is detached from the stationary mold section by laterally moving the dummy core 5 (or other instrumentality inserted within the article 4) to free the article from the stationary mold section 2 by the internal engagement of the article and the application of a force thereto which would strip it from the stationary section 2 of the mold. It should be understood that the element by which the internal engagement of the article is effected should not have a plugging or tight fit into the article but should have a loose fit in order that when the parts are positioned as shown in Fig. 5 the article will be free to drop, as shown by the arrow on the article 4 in said figure.

From the foregoing description taken in connection with the accompanying drawings, it is thought the invention will be readily understood by those skilled in the art.

What I claim is:

1. In the art of cup pastry molding and baking in which is employed split molds and cores; the method of releasing the article from the split molds which consists in first moving one section of the mold while holding the article by a member internally and by the other mold section externally to prevent movement of the article in the direction of the moved mold section, then bodily laterally moving the member holding the article internally in a direction at right angles to the longitudinal axis of the mold to release the article from external engagement with the other mold section, thereby releasing the article from both mold sections.

2. In the art of cup pastry molding and baking in which is employed split molds and cores; the method of releasing the article from the split molds which consists in first withdrawing the core from the article, then moving one section of the mold in a plane at right angles to the axis of the core while holding the article, by a member internally, from movement with the said moving section and against the remaining section of the mold, then disengaging the article from the said remaining section by a lateral movement of said member away from said remaining mold section, thereby releasing the article from both mold sections and permitting the article to drop.

3. In the art of cup pastry molding and baking in which is employed split molds and cores; the method of releasing the article from the split molds which consists in detaching the core from the article, moving one section of the mold away from the article in a plane at right angles to the axis of the core while holding the article by a member internally and by the other mold section externally, to prevent movement of the article in the direction of the moved mold section, then detaching the article from the second mold section by a lateral movement of the internally engaging member thereby releasing the article from both mold sections and ejecting the same.

4. In the art of cup pastry molding and baking in which is employed split molds and cores; the method of releasing the articles from the split molds and their cores, which consists in detaching the core from the article, holding one mold section against movement while moving the other section in a plane at right angles to the axis of the core and holding the article against the held section by a member internally to prevent movement of the article in the direction of the moved mold section, then laterally moving the member holding the article internally in a direction at right angles to the longitudinal axis of the mold to release the article from external engagement with the held mold section, thereby releasing the article from both mold sections and discharging the same.

5. In the art of cup pastry molding and baking in which is employed split molds and cores; the method of releasing the article from the split molds which consists in first opening one section of the mold while holding the article by a member internally and by the other mold section externally to prevent movement of the article in the direction of the opening mold section, then imparting movement to the member holding the article internally away from the said other mold section, thereby releasing the article from both mold sections and ejecting the same.

ROY G. KRATZ.